United States Patent [19]

Pichat

[11] Patent Number: 5,599,272
[45] Date of Patent: Feb. 4, 1997

[54] METHOD FOR THE MANUFACTURE OF A SOLID BY THE MIXING OF HYDRATES OF ALKALINE EARTH OXIDES AND HYDRATES OF HEAVY METAL OXIDES

[76] Inventor: Philippe Pichat, 18, rue des Tournelles, 75004 Paris, France

[21] Appl. No.: 346,182

[22] Filed: Nov. 22, 1994

[30] Foreign Application Priority Data

Nov. 26, 1993 [FR] France .................................. 93 14192

[51] Int. Cl.⁶ ........................................................ A62D 3/00
[52] U.S. Cl. ............................................ 588/256; 588/257
[58] Field of Search .............................. 588/18, 236, 256, 588/257; 405/128, 129; 210/751

[56] References Cited

U.S. PATENT DOCUMENTS

| | | | |
|---|---|---|---|
| 4,118,243 | 10/1978 | Sandesara | 588/256 |
| 4,375,986 | 3/1983 | Pichat | 106/DIG. 1 X |
| 4,432,666 | 2/1984 | Frey et al. | 405/129 |
| 4,547,290 | 10/1985 | Pichat | 210/751 |
| 4,601,832 | 7/1986 | Hooykaas | 588/256 X |
| 4,680,126 | 7/1987 | Frankard et al. | 588/236 X |
| 5,177,305 | 1/1993 | Pichat | 588/257 |
| 5,252,127 | 10/1993 | Pichat | 588/256 X |
| 5,276,252 | 1/1994 | Biros et al. | 588/249 |
| 5,304,710 | 4/1994 | Kigel et al. | 588/257 |
| 5,330,658 | 7/1994 | Grant et al. | 588/18 X |
| 5,405,536 | 4/1995 | Christy | 210/751 X |

FOREIGN PATENT DOCUMENTS

| | | |
|---|---|---|
| 0050371 | 4/1982 | European Pat. Off. . |
| 0389328 | 9/1990 | European Pat. Off. . |
| 8903587 | 9/1990 | France . |
| 2917123 | 11/1979 | Germany . |
| WO92/18437 | 10/1992 | WIPO . |

*Primary Examiner*—George A. Suchfield
*Attorney, Agent, or Firm*—William L. Feeney; Kerkam, Stowell, Kondracki & Clarke, P.C.

[57] ABSTRACT

Disclosed is a method for the manufacture of a solid that is practically insoluble in water and non-pollutant. pollutant. This method comprises a step in which there are mixed, in an aqueous medium, at least two compounds in order to obtain a paste. According to this method, one of the compounds or first compound comprises hydrates of alkaline earth oxides and another compound or second compound comprises hydrates of heavy metal oxides; the free water contained in the paste or liquid is present in the liquid in a proportion, in terms of quantities, of 20% to 60% by weight of the total mixture; the solid obtained being substantially without silicates and aluminates. The disclosed method is applicable, in particular, to waste treatment and to the field of civil engineering and construction.

13 Claims, No Drawings

ND PATENT NO. 5,599,272

METHOD FOR THE MANUFACTURE OF A SOLID BY THE MIXING OF HYDRATES OF ALKALINE EARTH OXIDES AND HYDRATES OF HEAVY METAL OXIDES

BACKGROUND OF THE INVENTION

1. Field of the Invention

The invention relates to a method for the manufacture of a solid and, more particularly, to a method for the manufacture of a solid that is practically insoluble in water and is non-pollutant.

2. Description of the Prior Art

Waste-water, namely industrial effluent or municipal waste-water, more commonly called liquid waste or sludge, is usually treated by various physical/chemical methods aimed in particular at precipitating the heavy metals that they contain in the form of hydrates of metal oxides having relatively little solubility.

The water from these hydrates is then separated, for example by filtering. A cake is thus obtained, containing about 60% of water. The water coming from the separation can be sent back into the environment.

The particles constituting this cake generally have a diameter of less than 200 microns and are not bound to one another. Thus, the cake has only low crush resistance and practically no cohesion. Once dumped, it may therefore break up, and a part of the heavy metals that it contains will be released by leaching in water.

In order to overcome these drawbacks, the cake is sometimes treated by means of the method described in the patent No. FR-A-2,644,358. There is then obtained a solid having good physical/chemical characteristics due to the presence of substantial quantities of silicates and aluminates.

However, the treatment described in this patent requires the mixing of the raw sludge with a source of lime and large quantities of silica and/or alumina.

Now, silica and/or alumina are materials that may be costly and are not always available at the place of treatment.

Furthermore the presence, in the dumps, of a non-negligible quantity of matter based on silica and/or alumina, which cannot be considered as wastes per se is a major drawback that has hitherto seemed to be inevitable.

The present invention is aimed at proposing a method for the manufacture of a solid that overcomes the above-mentioned drawbacks and makes it possible, in particular, to obtain, at low cost, a solid that is practically insoluble in water and is non-pollutant, without using a source of silica and/or alumina and in reducing, to the very minimum, the introduction into this solid of matter that cannot be considered to be waste.

SUMMARY OF THE INVENTION

This aim, as well as others that shall appear hereinafter, are achieved by means of a method for the manufacture of a solid that is practically insoluble in water and non-pollutant, comprising a step in which there are mixed, in an aqueous medium, at least two compounds in order to obtain a paste, wherein one of the compounds or first compound comprises hydrates of alkaline earth oxides and another compound or second compound comprises hydrates of heavy metal oxides; wherein the free water contained in the paste or liquid is present in the liquid in a proportion, in terms of quantities, of 20% to 60% by weight of the total mixture; the solid obtained being substantially without silicates and aluminates.

MORE DETAILED DESCRIPTION

The following description, which does not have any restrictive character, will provided for a clearer understanding of the way in which in the invention can be implemented.

The waste-water or polluted water, namely industrial effluent or municipal waste-water, more commonly called liquid waste or sludge, is treated by a variety of physical/chemical methods that are aimed, in particular, at neutralizing the acids that they contain and at precipitating their heavy metals in the form of hydrated oxides having little solubility. In practice, lime and an iron salt are added to this liquid sludge.

After flocculation and then decantation, the water is separated from the hydrates, for example by centrifugation or by filtration, by the use of a filter press or any other type of filter.

There is then obtained a compound or second compound with very low cohesion, namely lower than about 5 kg/cm2 This second compound comprises a substantial quantity of hydrates of heavy metal oxides in the form of particles whose average diameter is generally less than about 200 microns. The particles of hydrates of heavy metals are not bonded to each other and remain in a form that favors their dissolving in water.

Should an iron salt have been used for the precipitation, the major part of the hydrates of heavy metal oxides is constituted by hydrates of iron oxides that can be written as $Me_p(OH)_n$ where Me is a metal and p and n are integers. However, other heavy metal hydrates are present since the raw sludge contains substantial quantities of, for example, Pb, Cd, Cr, Cu, Zn, Ni, Hg, Mn, Co, Ti and Sn.

If the second compound is mixed with a first compound comprising hydrates of alkaline earth oxides which may be written as $At(OH)_2$ where At is an alkaline earth then, by adjusting the quantity of free water so that it is in the range of 20% to 60% and preferably in the range of 30% to 50% of the total weight of the mixture, there is obtained a liquid paste that has the astonishing property of forming a solid that is practically insoluble in water and is a non-pollutant.

The first compound comprises alkaline earths, essentially in the form of hydrates of oxides. It is therefore substantially without alkaline earth oxides. Indeed, the particles of alkaline earth oxides mixed according to the method of the present invention, in the presence of water, generally get hydrated on the surface only. The core of these particles then initially remains in an oxidized form. At a second stage, the water gets diffused into the core of the above-mentioned particles and gradually reacts with the oxides. Now, the reaction $AtO + H_2O \rightarrow At(OH)_2$ is a reaction that is accompanied by a wide variation in volume. Thus, the particles and the solid formed will be destabilized by swelling. It will be preferred, therefore, if only alkaline earth oxides are available, to add a step prior to the method of the invention that consists in hydrating these oxides before they are mixed so that essentially the only substances mixed are hydrates of alkaline earth oxides with a view to forming the solid. Should the alkaline earth of the first compound be calcium, namely if it should be lime and if the lime is quicklime, then it is slaked before being mixed.

Furthermore, the above-mentioned reaction $AtO + H_2O \rightarrow At(OH)_2$ releases a great quantity of energy which, if it is excessive, is harmful to the method since it prompts a drying of the mixture.

According to the invention, the weight of the hydrates of heavy metal oxides added to the weight of the hydrates of alkaline earth oxides is advantageously greater than 30% by weight of the solid obtained.

The presence of chlorides, for example in a proportion of about 5% by weight, favors the manufacture of the solid.

Naturally, the mixing is sufficient for the paste to be homogeneous. It is therefore done by means of a very carefully prepared malaxation performed, for example, under vacuum and sometimes at temperatures above ambient temperature, namely temperatures of up to 280° C., in order to bring the quantity of water in the mixture to a satisfactory percentage.

A subsequent drying of the mixture, notably at temperatures of over 300° C., would be harmful to the manufacture of the solid. Indeed, solidification is a slow process that requires the presence of water. A drying operation would give rise to an evaporation of the water, thus blocking the solidification process. It will therefore not be sought, according to the invention, to dry the mixture obtained.

Furthermore, the reaction takes place preferably at a pH of 7.5 to 10.5 and, even more preferably, at a pH of 8.5 to 9.5.

The manufacture of the solid can be explained by the fact that in a particularly concentrated medium, the molecules of hydrates of alkaline earth oxides and molecules of hydrates of heavy metal oxides interact with one another so that, once the shaking of the mixture is stopped, they constitute a bond that is strong enough to form a solid through the presence of compounds of the $[xMe_p(OH)_n, yAt(OH)_2, zH_2O]$ where x, y, z are integers; If the water is not present in the mixture in a sufficient quantity, it acts as a factor limiting the reaction of manufacture of the solid. However, if it is present in the mixture in an excessively large quantity, it disperses the molecules, and the intermolecular bonds, which are excessively weakened, are no longer sufficient to enable the manufacture of a solid.

The ratio between the number of moles of hydrates of heavy metal oxides and the number of moles of hydrates of alkaline earth oxides is advantageously close to 1. Nevertheless, this ratio may vary within limits of 0.5 to 5.

Since the initial compounds have little or no silica and/or alumina, the solid obtained is substantially without silicates and aluminates. However, the presence of a small quantity of $Al_2O_3$ and of $SiO_2$ in the mixture, for example a quantity of less than about 20%, does not cause any difficulty. This is why the method can be implemented on red sludge from Gardanne (France) which is a residue from the manufacture of alumina by a method using bauxite as a raw material and which has an $SiO_2$ content, added to the $Al_2O_3$ content, of the order of 20%.

The mechanical properties of the solid improve in the course of time. The solubility in water diminishes in parallel. It is generally lower than 5% at the end of some months, for example at the end of ten months.

Examples of manufacturing methods here below enable a clearer appreciation of the value of the invention, with respect to the characteristics of the solid obtained.

EXAMPLE 1

The first example of a manufacturing method illustrates the value of the invention in relation to leaching.

This example uses a filter cake (FC), substantially without silica and/or alumina and comprising 60% of water. This FC is obtained conventionally after the flocculation, decantation and filtration of a raw sludge to which an iron sulfate has been added.

100 kg of this FC is mixed with 30 kg of hydrated lime and water. The water is present in a proportion of of the total weight of the final mixture. An exothermic reaction is rapidly set off. The temperature then goes up to about 40 degree Celsius, and the mixture solidifies in a few hours. A sample of the monolithic solid obtained is stored for 80 hours before being subjected to the AFNOR X31210 leaching test. According to this test there are obtained, for different heavy metals, three series of measurements I, II, III pertaining to the COD (chemical oxygen demand) and to the leaching.

In parallel, the same test is carried out on the raw sludge.

The following results are then obtained, assembled in the table 1, and expressed in mg by kg:

TABLE 1

|  | Raw sludge | Solid |
| --- | --- | --- |
| COD | 4200 | 500 |
| Pb | 0.16 | <0.03 |
| Cd | 0.19 | 0.1 |
| Cr | 0.4 | 0.1 |
| Cu | 1.63 | 0.2 |
| Zn | 9.78 | 0.3 |
| Cr6+ | <0.3 | <0.1 |
| Ni | 2.87 | 0.2 |

The same tests have been carried out with hydrated magnesium oxide $Mg(OH)_2$.

Similar results are obtained.

EXAMPLE 2

This example sets up a comparison between the known method of waste treatment with silica and/or alumina and the method of the invention.

This example implements fume cleaning residues (FCRs) coming from an incinerator for the treatment of industrial effluent comprising notably inorganic chlorides and heavy metals. As is well-known, FCRs contain hydrates of alkaline earth oxides.

These FCRs are substantially without silica and/or alumina.

In a first test, 152 kg of FCR is mixed at ambient temperature with water, 33 kg of silica and 100 kg of FC obtained previously. Immediately, an exothermic reaction is set up. The temperature of the mixture reaches 45° C., and this mixture solidifies within a few hours. The monolithic solid obtained has a high percentage of silicates.

A sample 1 of this solid is preserved for 45 days. It is then subjected to the AFNOR X31210 leaching test.

In a second test, 150 kg of FCR is mixed, under the same conditions of temperature, with 100 kg of FC. The quantity of free water in the mixture is adjusted at about 40% of the total weight of this mixture.

Immediately, an exothermic reaction is set off. The temperature then reaches about 40 degrees, and the mixture solidifies.

A sample 2 according to the invention is preserved in the same conditions as the sample 1, and it is subjected to the same test.

The following results, expressed in mg/kg are obtained and have been entered in the Table 2 below:

TABLE 2

|  | Sample 2 | | | Sample 1 | | |
| --- | --- | --- | --- | --- | --- | --- |
|  | I | II | III | I | II | III |
| COD | 300 | 200 | <100 | 400 | 100 | <100 |
| Phenol | 0.15 | 0.25 | 0.48 | 0.20 | 0.31 | 0.30 |
| CN– | 0.20 | 0.30 | 0.20 | 0.17 | 0.13 | 0.0 |
| Pb | <0.01 | <0.01 | <0.01 | <0.01 | <0.01 | <0.01 |
| Cd | 0.08 | 0.07 | 0.08 | 0.07 | 0.07 | 0.07 |
| Cr | 0.09 | 0.07 | 0.06 | 0.36 | 0.15 | 0.10 |
| Cu | 0.24 | 0.20 | 0.21 | 0.22 | 0.17 | 0.14 |
| Fe | 0.60 | 0.63 | 0.54 | 1.41 | 1.06 | 0.55 |
| Zn | 1.77 | 0.53 | 0.42 | 0.32 | 0.24 | 0.16 |
| Cr6+ | <0.10 | <0.10 | <0.10 | <0.10 | <0.10 | <0.10 |
| Ni | 0.11 | 0.07 | 0.05 | 0.10 | 0.06 | 0.07 |

Unexpectedly, the results of leaching obtained for the sample 2 according to the invention are similar to those obtained for the sample 1.

On the contrary, a penetration test with a Vicat needle indicates that, after 45 days, the crush resistance of the sample 2 is about 3 MPa while that of the sample 1 is 6 MPa.

However, the mechanical properties of the solid get improved for about 18 months when it is stored at ordinary temperature. It can be estimated that the crush resistance of a solid of the invention will be equal to about 20 MPa at 18 months.

Similarly, the soluble fraction of the samples 2 according to the invention gradually diminishes. Indeed, it is about 9% at one month, 8% at four months, 5% at eight months and about 3.5% at 14 months.

EXAMPLE 3

This example uses 40 kg of the above FC which is dried at 200° C. 150 kg of REF and a quantity of water corresponding to about 40% of the mixture are then added to this cake.

As in the foregoing example, an exothermic reaction is set off and the temperature of the mixture then reaches 40° C.

At 65 days, the solid obtained is subjected to the AFNOR X31210 leaching test and the results shown the table 3 below, expressed in mg/kg, are obtained.

TABLE 3

|  | I | II | III |
| --- | --- | --- | --- |
| COD | 100 | 300 | 100 |
| Phenol | <0.01 | 0.20 | 0.19 |
| Pb | <0.01 | <0.01 | <0.01 |
| Cd | 0.09 | 0.07 | 0.08 |
| Cr | 0.32 | 0.4 | 0.2 |
| Cu | 0.60 | 0.93 | 0.66 |
| Fe | 4.81 | 5.21 | 5.18 |
| Zn | 0.38 | 0.50 | 0.40 |
| Cr6+ | 0.35 | 0.17 | 0.16 |
| Ni | 0.23 | 0.29 | 0.19 |

EXAMPLE 4

In this example, 100 kg of REF is mixed with 40 kg of red sludge from Gardanne (France), comprising notably 27% of $Fe_2O_3$. Water is present in the mixture in a proportion of about 40%.

At 28 days, the solid obtained is subjected to the AFNOR X31210 leaching test. The following results expressed in mg/kg are obtained.

TABLE 4

|  | I | II | III |
| --- | --- | --- | --- |
| pH | 12 | 7 | 7 |
| COD | 1000 | 500 | 200 |
| Phenol | <2 | <2 | <2 |
| Cn– | <0.5 | <0.5 | <0.5 |
| Cr6+ | 0.2 | 0.05 | 0.06 |
| Cd | <0.1 | <0.1 | <0.1 |
| Cr | 0.24 | 0.01 | 0.03 |
| Cu | <0.2 | <0.2 | <0.2 |
| Fe | 0.33 | 0.18 | 0.3 |
| Ni | <0.01 | <0.01 | <0.01 |
| Pb | 0.01 | 0.1 | 0.12 |
| Zn | <0.01 | <0.01 | <0.03 |

Naturally, the method according to the invention for the manufacture of a solid can be applied notably in the case of pollution control with a view, for example, to a storage operation. However, the invention goes beyond the framework defined by the field of waste treatment. Indeed, the invention can be applied in a particularly promising way, for example in the field of civil engineering and construction, for the manufacture of a structural material for building fabrics.

What is claimed is:

1. A method for the manufacture of a solid that is practically insoluble in water and non-pollutant, comprising the steps of:

providing an aqueous medium; and mixing the aqueous medium with at least first and second compounds in order to obtain a paste, wherein the first compound comprises hydrates of alkaline earth oxides and the second compound comprises hydrates of heavy metal oxides; wherein the mixing is performed so that free water contained in the paste or liquid is present in the liquid in a proportion, in terms of quantities, of 20% to 60% by weight of the total mixture; and wherein the solid obtained is substantially without silicates and aluminates.

2. A method according to claim 1, wherein the weight of the hydrates of alkaline earth oxides added to the weight of the hydrates of heavy metal oxides of the solid obtained is greater than 30% of the total weight of said solid.

3. A method according to claim 2, further comprising the step of adding chlorides constituting about 5%, by weight, of the weight of the total mixture.

4. A method according to claim 1, wherein the mixing step is done at a temperature of less than 280° C. and at a pH ranging from 7.5 to 10.5.

5. A method according to claim 1, wherein the mixing is done under vacuum.

6. A method according to claim 1, wherein the alkaline earth are calcium or magnesium.

7. A method according to claim 6, wherein the alkaline earth oxide is lime or magnesium.

8. A method according to claim 7, wherein the first compound comprising hydrates of alkaline earth oxide is a fume cleaning residue.

9. A method according to claim 1, wherein the second compound comprises hydrates of heavy metal oxides in the form of particles whose mean diameter is smaller than about 200 microns.

10. A method according to claim 9, wherein the heavy metal is constituted by at least one of the following metals: chromium, manganese, iron, cobalt, nickel, copper, zinc, cadmium, lead, titanium, tin and mercury.

11. A method according to claim 10, wherein the second compound comprising hydrates of heavy metal oxides is obtained following the step of treatment of the waste water, after centrifugation or filtration, by means of a filter press.

12. A method according to claim 1 further comprising the step of, before the mixing, hydrating alkaline earth oxides in order to obtain the hydrates of alkaline earth oxides.

13. The method according to claim 1 wherein the solid is solidified and stabilized at the physical/chemical level.

* * * * *